| United States Patent [19] | [11] | 4,043,975 |
|---|---|---|
| Bost | [45] | Aug. 23, 1977 |

[54] FLAME-RESISTANT POLYOLEFIN COMPOSITIONS

[75] Inventor: Howard W. Bost, Bartlesville, Okla.

[73] Assignee: Phillips Petroleum Company, Bartlesville, Okla.

[21] Appl. No.: 741,584

[22] Filed: Nov. 12, 1976

[51] Int. Cl.$^2$ .......................... C08K 5/52; C08K 3/22
[52] U.S. Cl. .................. 260/45.75 W; 260/45.8 NT; 260/45.9 AD
[58] Field of Search ............... 260/45.75 W, 45.8 NT, 260/45.9 AD

[56] References Cited

U.S. PATENT DOCUMENTS

| 3,386,948 | 6/1968 | Needham | 260/45.75 W |
|---|---|---|---|
| 3,649,591 | 3/1972 | Murray et al. | 260/45.75 W |
| 3,810,862 | 5/1974 | Mathis | 260/42.45 |
| 3,926,883 | 12/1975 | Touval | 260/45.75 W |
| 3,936,416 | 2/1976 | Brady | 260/45.9 NP |

OTHER PUBLICATIONS

Chemical Abstracts 68 1968, citation 41213u.

*Primary Examiner*—V. P. Hoke

[57] ABSTRACT

The fire-resistance properties of polyolefin compositions containing certain phosphorus-containing flame retardants are enhanced by incorporating in said compositions a suitable amount of at least one zinc compound selected from the group consisting of zinc oxide and zinc bromide.

22 Claims, No Drawings

FLAME-RESISTANT POLYOLEFIN COMPOSITIONS

This invention relates to flame-resistant polyolefin compositions.

Various additives have been proposed for imparting flame resistance to polyolefins. U.S. Pat. No. 3,936,416 which issued Feb. 3, 1976 on application Ser. No. 382,169, filed July 24, 1973, by Donnie G. Brady, discloses the employment of various phosphorous-containing additives in preparing a flame-resistant polyolefin composition. While additives of that type are quite capable of imparting various degrees of flame resistance to polyolefins, in order to obtain certain levels of flame resistance it is sometimes necessary to employ loadings of the phosphorus-containing additive which affect other physical properties of the polyolefin composition in such a manner that the resulting polyolefin compositions are not satisfactory for certain applications. For example, high loadings of the phosphorus-containing flame retardant can so affect the tensile strength and brittleness of the polyolefin composition that it would not be satisfactory for certain applications. Accordingly, it is desirable to enhance the effectiveness of such phosphorus-containing flame retardants so that the loading of the additives in the polyolefin composition can be lowered without also lowering the flame resistance of the polyolefin composition.

Therefore, an object of this invention is to provide a composition in which an additive is employed to lower the amount of phosphorus-containing retardant that is necessary to provide a given level of flame resistance to a polyolefin composition.

Another object of this invention is to provide a flame resistant polyolefins composition.

Other aspects, objects, and advantages of the present invention will be obvious to those skilled in the art having the benefit of the present disclosure.

According to the present invention, a flame-resistant polyolefin composition is provided comprising (1) normally solid polyolefin; (2) a certain type of phosphorus-containing flame retardant; and (3) at least one zinc compound selected from the group consisting of zinc bromide and zinc oxide wherein said at least one zinc compound is present in an amount which will enhance the flame resistance provided by the phosphorus-containing flame retardant.

Examples of normally solid polyolefins that can be rendered flame resistant in accordance with this invention include polymers of mono-alpha olefins having the general formula $CH_2 = CHR$ wherein R represents hydrogen or a hydrocarbyl radical having from 1 to 10 carbon atoms and selected from the group consisting of aryl, alkyl, cycloalkyl, and combinations thereof such as alkaryl, and aralkyl. Typical polymers are the homopolymers of ethylene, propylene, butene-1, isobutylene, pentene-1, styrene, diethylstyrene and dimethylstyrene and the copolymers or terpolymers of two or more of such alpha-olefins. Such polymers can be prepared by any suitable process which produces a normally solid polyolefin. A presently favored copolymer is a propylene-ethylene copolymer in which the ethylene moiety is present in amounts ranging from about 2 to about 25 weight percent of the copolymer, or preferably from about 5 to about 15 weight percent of the copolymer. The preparation of such a propylene-ethylene copolymer is described in J. S. Gwinn, U.S. 3,689,595, issued Sept. 5, 1972.

The phosphorus-containing flame retardant employed in this invention is the product which results when suitable amounts of (1) at least one phosphorus oxide compound of the formula $(P_2O_5)_{0.5-1.0}(H_2O)_{0.0-1.5}$, (2) melamine, and (3) at least one saturated open-chain polyol containing from 5 to 15 carbon atoms and from 4 to 8 hydroxyl groups are combined and heated prior to incorporation into a polyolefin composition under such conditions that the product will not cause significant foaming of the polyolefin composition when the polyolefin composition is subsequently subjected to molding conditions.

In general the heating required to produce the phosphorus-containing flame retardant as described in the preceding paragraph will be conducted at a temperature in the range of about 100° to about 300° C for about 1 to about 25 hours.

Any amounts of the three above-named ingredients can be employed which will result in a product having flame resistance. Generally, it is considered that flame resistance will be provided if 1 to 100 parts by weight of each of the three above-named ingredients is employed in preparing the phosphorus-containing flame retardant where all parts by weight are on the same weight basis. Examples of such phosphorus-containing flame retardants include the following; (1) the reaction product of melamine pyrophosphate and dipentaerythritol; (2) the reaction product of phosphoric acid, urea, melamine, and at least one of pentaerythritol, dipentaerythritol, and tripentaerythritol; (3) the reaction product of phosphoric acid, phosphorus pentoxide, melamine, and at least one of pentaerythritol, dipentaerythritol, and tripentaerythritol; and (4) the reaction product of a condensed phosphoric acid, melamine, and at least one of pentaerythritol, dipentaerythritol, and tripentaerythritol.

Phosphorus oxide compounds of the formula $(P_2O_5)_{0.5-1.0}(H_2O)_{0.0-1.5}$ include, for example, phosphorus pentoxide, orthophosphoric acid, and condensed phosphoric acids. A condensed phosphoric acid is a phosphoric acid containing any quantity of one or more polyphosphoric acids and/or metaphosphoric acids. Any such acid can be employed in this invention. The polyphosphoric acids include the dimeric pyrophosphoric acid and other entities such as the trimer through the nonamer and even more highly condensed species. The properties of and compositions of the condensed phosphoric acids vary with the $P_2O_5$ content of the condensed phosphoric acid as discussed in Bell, "Composition of Strong Phosphoric Acids", Industrial and Engineering Chemistry, 40, 1464-1467 (1948). Although any condensed phosphoric acid is suitable for the present invention, generally a condensed phosphoric acid having from about 70 to about 100 weight percent $P_2O_5$ can be employed; or, more preferably, the condensed phosphoric acid employed contains about 80 to about 90 weight percent $P_2O_5$. Such condensed phosphoric acids may be prepared by any technique known by those skilled in this area.

The saturated open-chain polyols employed in preparing the phosphorus-containing flame retardant contain from 5 to 15 carbon atoms and from 4 to 8 hydroxyl groups per molecule. Preferably, in addition to C, H, and hydroxyl groups the only other functional groups in the polyols are a maximum of two ether linkages per molecule. Examples of suitable polyols include, sorbitol, manitol, pentaerythritol, dipentaerythritol, and tripentaerythritol, and mixtures of any two or more thereof.

Also in preparing the phosphorus-containing flame retardant, minor amounts of other materials can be added to improve its color, physical handling properties, and the like.

As indicated above, one example of a phosphorus-containing flame retardant is the reaction product of melamine pyrophosphate and at least one polyol selected from pentaerythritol, dipentaerythritol, and tripentaerythritol. The melamine pyrophosphate and polyol are combined in proportions that will impart flame resistance to a synthetic resin. In general, the weight ratio of melamine pyrophosphate to polyol will be in the range of about 14:1 to about 0.2:1, or more preferably from about 4:1 to about 1:1. Generally the polyol and melamine pyrophosphate are heated at a temperature in the range of about 175° C to about 275° C until the foaming has substantially subsided.

Another phosphorus-containing flame retardant mentioned above is the reaction product of orthophosphoric acid, urea, melamine, and at least one polyol selected from pentaerythritol, dipentaerythritol, and tripentaerythritol. Although the reactants can be employed in any proportions that will impart flame resistance, generally there is employed from about 30 to about 100 parts by weight of orthophosphoric acid, about 40 to about 125 parts by weight of urea, about 3 to about 90 parts by weight of melamine, and about 5 to about 90 parts by weight of polyol, where all parts by weight are on the same weight basis. Within this general range the preferred amounts of reactants to be employed are about 60 to about 80 parts by weight orthophosphoric acid, about 75 to about 95 parts by weight urea, about 5 to about 70 parts by weight melamine, and about 10 to about 40 parts by weight polyol.

The reactants, viz., orthophosphoric acid, urea, polyol, and melamine can be simultaneously reacted. Alternatively, the orthophosphoric acid and the urea can be combined and then polyol added to provide a mixture which is heated until substantially all the esterification of the phosphoric acid has taken place, to yield a solid esterification product. This esterification product is combined with the melamine and then the resulting mixture is subjected to heating which will insure that the flame retardant when incorporated into a synthetic resin will not cause significant foaming when the synthetic resin is subjected to molding conditions, but will impart flame resistance to said synthetic resin. Another alternative involves combining the phosphoric acid and polyol, then adding the urea and heating the mixture until substantially all the esterification has taken place to yield a solid esterification product, then the melamine is combined with the esterification product and the admixture is subjected to degassing, as in the previously described method. Generally, when this method or the immediately preceding described method is employed for preparing the inventive flame retardant, the weight ratio of the esterification product to melamine is in the range of about 10:1 to about 1:2 or, preferably, in the range of about 6:1 to about 1:2.

In preparing the flame retardant from urea, phosphoric acid, polyol, and melamine the temperatures found satisfactory for degassing the retardant are generally in the range of about 190° to about 280° C. The time required for degassing is generally in the range of from about 0.5 to about 4 hours. The esterification generally requires heating for several hours at a temperature of at least about 100° C.

A phosphorus-containing flame retardant suitable for being employed in this invention can also be prepared by combining polyphosphoric acid (or a mixture of phosphorus pentoxide and orthophosphoric acid) with melamine and polyol. Generally, this type of phosphorus-containing flame retardant is prepared by slowly adding to the condensed polyphosphoric acid (or mixture of phosphorus pentoxide and orthophosphoric acid) the polyol in admixture with about 5 to about 15 weight percent of the melamine, with stirring, with the temperature being in the range of about 75° to about 150° C., more usually about 110° to about 130° C., for about 0.5 to about 8 hours, more usually about 0.5 to about 4 hours. With the temperature being in the range of about 120° to about 300° C, usually about 150° to about 250° C, the remainder of the melamine is added over the course of about 0.1 to about 5 hours, usually about 0.5 to about 3 hours. Further reaction, curing, and degassing is carried out by continued heating with the temperature being in the range of about 150° to 300° C., usually about 240° to about 270° C for about one to about 10 hours, usually about 2 to about 5 hours. The reaction product is then generally cooled and pulverized to a suitable particle size for convenient incorporation into a thermoplastic polymer. Preferably, during the preparation, whenever the temperature is above room temperature, a nonoxidative atmosphere is employed.

When preparing such phosphorus-containing flame retardants from orthophosphoric acid, phosphorus pentoxide, polyol, and melamine, the parts by weight of each of those ingredients per hundred parts by weight of the total of those ingredients is generally in the range of 0.5–25, 10–75, 5–30, and 10–70 respectively, and preferably in the range of 5–15, 15–50, 10–25, and 15–50 respectively. It is especially preferred that the orthophosphoric acid, phosphorus pentoxide, melamine, and polyol be employed in amounts such that the respective molar ratio of the ingredients is in the range of 0.5–1.5-:2–3:2–3:0.5–2.5

When preparing such phosphorus-containing flame retardants from condensed phosphoric acid, melamine, and polyol, the parts by weight of each of those ingredients per hundred parts by weight of the total of those ingredients is generally in the range of 25–75, 10–70, and 5–50 respectively, and preferably in the range of 30–60, 25–50, and 10–40 respectively.

Regardless of the method chosen for preparation, generally after the phosphorus-containing flame retardant is prepared, it is allowed to cool to form a solid and is then pulverized to a form that is easily compounded into a polyolefin resin.

In the present invention the phosphorus-containing flame retardant is added to the polyolefin in an amount that alone would be insufficient to provide a flame resistance rating of V-O according to a modified U.L.-94 flame test that will be now described. Underwriters Laboratory has developed a vertical burning test which is set forth in Underwriters Laboratory Bulletin 94 and is for this reason denoted as the U.L.-94 vertical burning test. A complete discussion of the U.L.-94 test procedure is provided in the article beginning on page 92 of the October 1970 issue of Modern Plastics. In developing the present invention a Modified U.L.-94 test was employed. The Modified U.L.-94 test involved the use of 5 inches × ½ inches × ⅛ inches test specimens. The test specimens were held vertically and ignited on their lower end with a standard U.L.-94 test flame for 10 seconds. The flame was then removed and the length of time for continued burning was measured. If the burning subsided within 30 seconds after flame removal, the flame was immediately applied again for 10 seconds. The flame was then removed and the length of time of continued burning measured again. Then the flame was applied to the sample one final time for 10 seconds. The average burning time of the three burns was noted. If the average burning was greater than 25 seconds it was classified as "fail". If the average burning time was less than 25 seconds but flaming particles or drops were released the composition was classed as V-II. If the average burning time was less than 25 seconds and no flaming particles or drops released the composition was classed as V-I. If the average burning time was 5 seconds or less and no flaming particles or drops were released during this time the composition was classified as V-O. Since a V-O flame resistance rating according to the Modified U.L.-94 test disclosed herein is satisfactory for most applications and since an object of this invention is to reduce the loading of flame retardants in the polyolefin, the compositions of this invention are limited to those which contain an amount of said phosphorus-containing flame retardant that alone is insufficient to provide the composition with a V-O flame rating according to the Modified U.L.-94 test disclosed herein. Generally, the amount of phosphorus-containing flame retardant which is insufficient to provide a flame rating of V-O will be less than 75 php or more often less than about 40 php. (The term "php" will be used in this disclosure to indicate parts by weight of an ingredient per hundred parts by weight of polyolefin).

In accordance with the present invention at least one zinc compound selected from zinc oxide and zinc bromide is employed in an amount sufficient to enhance the flame resistance provided by the phosphorus-containing flame retardant. Generally, when the amount of phosphorus-containing flame retardant is in the range of about 10 to about 75 php an enhancing amount of said at least one zinc compound will be in the range of about 0.1 to about 15 php. When the amount of phosphorus-containing flame retardant is in the range of about 15 to about 40 php an enhancing amount of said at least one zinc compound will be in the range of about 0.5 to about 8 php.

The polyolefin compositions of the present invention can also include additives generally employed in polyolefin compositions, such as pigments and antioxidants. Of course, the amounts and types of other additives employed will depend upon the properties desired in the resulting polyolefin compositions.

One advantageous embodiment of the present invention includes a suitable amount of a hydrohalide salt of a monoamine or diamine in which the amine group is attached to a hydrocarbyl radical which is aromatic and/or aliphatic wherein the number of carbon atoms in said hydrocarbyl radical is in the range of from about 2 to about 24. Such hydrohalide salts have been noted to also enhance the flame retardancy effect of the phosphorus-containing flame retardant employed in this invention. Particularly preferred hydrohalide salts are alkylene diamine dihydrochlorides and alkylene diamine dihydrobromides, for example, ethylenediamine dihydrobromide and ethylenediamine dihydrochloride. When employed, the amount of said hydrohalide salt utilized is such that the combination of said hydrohalide salt and said phosphorus-containing flame retardant would alone be insufficient to impart to the polyolefin employed a flame resistance rating of V-O according to the modified U.L.-94 test disclosed herein. Generally when the amount of phosphorus-containing flame retardant employed is in the range of about 10 to about 75 php and the amount of said at least one zinc compound is in the range of about 0.1 to about 15 php, the amount of hydrohalide salt is in the range of about 0.1 to about 15 php. When the amounts of phosphorus-containing flame retardant and said at least one zinc compound are in the range of respectively about 15 to about 40 php and about 0.5 to about 8 php, the amount of hydrohalide salt is preferably in the range of about 0.5 to about 8 php.

In preparing the polyolefin compositions of the present invention, any suitable procedure can be used for incorporating the various additives into the polyolefin. Usually the polyolefin is heated to a temperature above its melting point and the various additives are dispersed therein, in any order, by milling or other suitable means until a uniform dispersion is obtained. Thereafter, the flame-resistant polyolefin composition is extruded, granulated, or formed into articles of manufacture as desired.

The present invention will be further illustrated by the following examples. In the examples the term PCFR refers to the phosphorus-containing flame retardant.

EXAMPLE I

Preparation of PCFR's

A series of PCFR compositions were prepared employing phosphorus pentoxide, 85% orthophosphoric acid, pentaerythritol, and melamine. The proportions of the ingredients employed are set forth in the following table.

TABLE I

| | | PCFR Preparations | | | |
|---|---|---|---|---|---|
| PCFR No. | $P_2O_5$, g | 85% $H_3PO_4$, g | Pentaerythritol, g | Melamine, g | Other, g |
| 1 | 141 | 46.5 | 76. | 151.5 | Octadecanol, 45 |
| 2 | 94 | 31 | 54.4 | 101 | None |
| 3 | 141 | 46.5 | 81.6 | 151.5 | None |
| 4 | 94 | 31 | 54.4 | 101 | None |

The preparations involved slowly adding the orthophosphoric acid to the phosphorus pentoxide. Thereafter a mixture of the pentaerythritol and about 10 weight percent of the melamine was added in small increments to the mixed acid with stirring. In preparing PCFR No. 1 octadecanol was included as a color improver. The octadecanol was added in admixture with the pentaerythritol. A nitrogen atmosphere was employed in the reactor at all times to exclude the presence of oxygen. Because of the viscosities developed it was necessary to take the temperatures outside the reaction vessel. Thus the temperatures reported herein only reflect an approximation of the temperature of the reaction.

In preparing PCFR No. 1 the mixture of pentaerythritol, melamine, and octadecanol was added to the mixed acid in portions with stirring during a time span of about 1 hour while the temperature was increased so that the temperature on the bottom of the reactor was about 115° C. Stirring was continued for about 2 more hours with the temperature on the bottom of the reactor being raised to about 140° C. The reactor was then shut down. On a subsequent day the resulting mixture was reheated with stirring to a temperature of about 140° C and then the remaining melamine was added over the course of about ½ hour. After all the melamine was added, stirring was continued for about 7 hours with the temperature of the reactor being in the range of about 220°-265° C. Thereafter the reactor was cooled and the PCFR recovered and pulverized for incorporation into polymer.

In preparing PCFR No. 2 the mixture of pentaerythritol and some melamine was added to the mixed acid during about ½ hour while the temperature of the reactor was raised to about 100° C. Stirring was continued for about 3 more hours with the temperature being raised to about 150° C. The then remaining melamine was added over a time span of about 5 hours. After all the melamine was added, stirring was continued for about 2 hours with the temperature being raised from about 160° to about 290° C. Thereafter, the product was recovered and pulverized.

In preparing PCFR No. 3, the mixture of pentaerythritol and part of the melamine was slowly added to the stirred mixed acid. Stirring was continued while the temperature was raised to about 120° C in about 2 hours. Thereafter the stirring was continued for about 3 hours while the temperature was gradually raised to about 250° C. The product was then recovered and pulverized.

In preparing PCFR No. 4 the mixture of polyphosphoric acid and small amount of melamine was added slowly to the mixed acid. The mixture was heated to about 110° C in the first ½ hour and was then allowed to cool 15 minutes down to a temperature of about 80° C. The temperature was then increased over the period of about 2½ hours to about 150° C. Then the remaining melamine was added over a time period of about 3 hours. After all the melamine was added the stirring was continued for about 2 hours with the temperature being raised from about 180° C to about 290° C. The product was then recovered and pulverized.

EXAMPLE II

A series of polymer compositions were prepared containing various metal compounds and the various PCFR's prepared in accordance with Example I. Also, some control compositions were prepared containing PCFR's and no additional metal compound.

The PCFR and the various metal compounds were incorporated into the polymers by mixing on a steam-heated roll mill. The roll mill temperature was in the range of 160°-185° C, usually 168°-178° C. When polymer fluff was used, the polymer and the PCFR were first dry blended and then milled for 4.5 minutes on the roll mill. When pelleted polymer was used, the polymer was first melted on the mill. Then the PCFR was milled in slowly. After completion of the addition of the PCFR, the milling was continued for 4.5 minutes. To obtain specimens for fire testing, the roll milled polymer samples (25-30 grams) were compression molded in "picture frame" molds at about 350° F with about 25 tons platen pressure. These samples were cut into strips 5 inches × ½ inches × ⅛ inches for use in the modified UL-94 test. Two of these strips were further cut into 5 inch × ¼ inch strips for oxygen index (O.I.) test. The flame-resistant characteristics of the various polymer compositions is summarized in Table II.

TABLE II

| | Metal Compounds in Polymers Containing PCFR | | | | | | |
|---|---|---|---|---|---|---|---|
| Run No. | Polymer | PCFR No. | php | Metal Type | php | Total loading php | Modified UL-94 |
| 1 | Polypropylene[a] | 1 | 40.0 | none | — | 40 | V-O |
| 2 | " | 1 | 37.5 | none | — | 37.5 | Fail |
| 3 | " | 1 | 22.5 | ZnO | 1.9 | 24.4 | V-I |
| 4 | " | 2 | 22.5 | ZnO | 1.9 | 24.4 | V-II |
| 5 | " | 2 | 22.5 | ZnO | 2.5 | 25 | V-O |
| 6 | " | 2 | 25.0 | ZnO | 1.5 | 26.5 | V-O |
| 7 | " | 2 | 25.0 | ZnO | 1.5 | 26.5 | V-I |
| 8 | " | 2 | 25.0 | ZnO | 1.9 | 26.9 | V-O |
| 9 | | 2 | 25.0 | ZnO | 2.5 | 27.5 | V-I |
| 10 | " | 2 | 25.0 | ZnO | 5.0 | 30.0 | V-I |
| 11 | " | 2 | 27.0 | ZnO | 1.9 | 28.9 | V-O |
| 12 | " | 2 | 25.0 | $Zn_2(B_6O_{11})$ | 7.4 | 32.4 | V-I |
| 13 | " | 2 | 25.0 | $TiO_2$ | 7.4 | 32.4 | Fail |
| 14 | " | 2 | 25.0 | $B_2O_3$ | 7.4 | 32.4 | Fail |
| 15 | " | 2 | 25.0 | $Bi_2O_3$ | 7.4 | 32.4 | V-I |
| 16 | " | 2 | 25.0 | CdO | 7.4 | 32.4 | V-II |
| 17 | " | 2 | 25.0 | CaO | 7.4 | 32.4 | Fail |
| 18 | " | 2 | 25.0 | MgO | 7.4 | 32.4 | Fail |
| 19 | " | 2 | 25.0 | $MoO_3$ | 7.4 | 32.4 | Fail |
| 20 | " | 2 | 25.0 | $SnO_2$ | 7.4 | 32.4 | Fail |
| 21 | " | 2 | 25.0 | $Zn(PO_3)_2$ | 7.4 | 32.4 | V-I |
| 22 | " | 2 | 25.0 | $Zn(Ac)_2 \cdot 2H_2O$ | 7.4 | 32.4 | V-I |
| 23 | " | 2 | 25.0 | $ZnSO_4 \cdot 7H_2O$ | 7.4 | 32.4 | Fail |
| 24 | " | 2 | 25.0 | $ZnBr_2$ | 5.0 | 30.0 | V-O |
| 25 | " | 3 | 22.5 | $ZnBr_2$ | 1.9 | 24.4 | Fail |
| 26 | " | 3 | 22.5 | $ZnBr_2$ | 2.5 | 25.0 | Fail |
| 27 | " | 3 | 22.5 | $ZnBr_2$ | 5.0 | 27.5 | V-II |
| 28 | " | 4 | 25 | ZnO | 1.5 | 26.5 | V-II |
| 29 | P/E Copolymer[b] | 2 | 22.5 | none | — | 22.5 | Fail |
| 30 | " | 4 | 26.2 | none | — | 26.2 | Fail |
| 31 | " | 2 | 30.0 | none | — | 30.0 | V-O |
| 32 | " | 3 | 20.0 | $ZnBr_2$ | 1.9 | 21.9 | V-O |
| 33 | 75/25 P/E Copolymer[b]/EPR[c] | none | | ZnO | 30.0 | 30.0 | Fail |

Notes:
*n.d. indicates - not determined
[a]Homopolymer, about 5 melt flow, used in fluff (unpelletized) form.
[b]Unpelletized copolymer of propylene with about 10 weight percent ethylene. About 4 melt flow.
[c]Commercial ethylene-propylene-rubber (Exxon Vistalon 606 EPR)

The examination of Runs 1 and 2 demonstrates that more than 37.5 php of PCFR No. 1 was needed to provide a flame rating of V-O. Run 2 employing 37.5 php of PCFR No. 1 gave a flame rating of fail whereas Run 3 employing only a 22.5 php of PCFR No. 1 and 1.9 php of zinc oxide provided a flame rating of V-1. This clearly establishes that the zinc oxide promotes the efficiency of that PCFR. A comparison of the flame ratings obtained in Runs 3 and 4 indicates that PCFR No. 2 was not quite as effective as PCFR No. 1, since at equal loadings of PCFR and zinc oxide a lower flame rating was obtained when the composition employed PCFR No. 2. Run 5 demonstrates that by increasing the loading of the zinc oxide slightly, a flame rating of V-O is obtained with only 22.5 php of PCFR No. 2. Runs 6-11 further demonstrate that zinc oxide promotes the effectiveness of PCFR No. 2.

In view of the fact that PCFR No. 2 was not quite as effective as PCFR No. 1, it follows that if no zinc oxide were employed, more than 37.5 php of PCFR No. 2 would have been required to obtain a rating of V-O. The data demonstrate that when zinc oxide is employed in combination with PCFR No. 2, the total loading of PCFR and zinc oxide required for a V-O flame rating is much less than 37.5 php.

Runs 7-10 demonstrate that for a given level of PCFR the enhancement does not necessarily increase with an increase in the amount of zinc oxide employed. Runs 12-23 indicate that 7.4 php of other metal oxides or zinc compounds were no more effective than a smaller amount of zinc oxide.

Run 24 demonstrates that zinc bromide did enhance the effectiveness of PCFR No. 2.

A comparison of Runs 25-27 demonstrates that zinc bromide can at the proper level also enhance the effectiveness of PCFR No. 3.

A comparison of Run 28 with Runs 6 and 7 indicates that PCFR No. 4 is not as effective as PCFR No. 2. PCFR No. 2, it will be recalled, was not quite as effective as PCFR No. 1. Run 28 establishes that the combined loading of PCFR No. 4 and zinc oxide required to give a flame rating of V-II is less than the amount of PCFR No. 1 that would be required to produce such a rating. It thus follows that Run 28 demonstrates that zinc oxide enhances the effectiveness of PCFR No. 4.

Runs 29-32 employed an ethylene/propylene copolymer instead of the polypropylene employed in the previously discussed runs. A comparison of Run 32 with Run 25 shows that PCFR No. 3 was more effective in the ethylene/propylene copolymer than in the polypropylene. However, in view of Runs 24 and 27 it is considered unlikely that 20 php of PCFR No. 3 could alone have given a V-O rating. Thus Run 32 Also indicates that the zinc bromide has enhanced the effect of PCFR No. 3.

Run 33 shows that zinc oxide, by itself, even when used in an amount as great as 30 php, is not an effective flame retardant.

EXAMPLE III

Another series of compositions were prepared to evaluate the effect of zinc oxide on PCFR when a hydrohalide salt as defined above was also present. The hydrohalide salt employed was ethylene diamine dihydrobromide (also denoted herein as EDHBr). The essential conditions and results of these runs are shown in Table III.

TABLE III

Effect of Zinc Compounds and Ethylenediamine Dihydrobromide in Flame Resistant Polymers

| Run No. | Polymer | PCFR No. | PCRF php | EDHBr php | Zinc Compound* php | Total loading php | Modified UL-94 |
|---|---|---|---|---|---|---|---|
| 1 | P/E Copolymer[b] | 2 | 22.5 | none | none | 22.5 | Fail |
| 2 | P/E Copolymer[b] | 4 | 22.5 | none | none | 22.5 | Fail |
| 3 | P/E Copolymer[b] | 4 | 26.2 | none | none | 26.2 | V-II |
| 4 | P/E Copolymer[b] | 4 | 26.8 | none | none | 26.8 | V-I |
| 5 | P/E Copolymer[b] | 4 | 30.0 | none | none | 30.0 | V-O |
| 6 | P/E Copolymer[b] | 2 | 30.0 | none | none | 30.0 | V-O |
| 7 | P/E Copolymer[b] | 4 | 40.0 | none | none | 40.0 | V-O |
| 8 | P/E Copolymer[b] | 2 | 22.5 | none | 2.5 | 25.0 | V-O |
| 9 | P/E Copolymer[b] | 4 | 22.5 | 1.9 | none | 24.4 | V-O |
| 10 | P/E Copolymer[b] | 4 | 22.5 | 1.9 | 1.9 | 26.3 | V-O |
| 11 | P/E Copolymer[b] | 4 | 22.5 | 5.0 | 2.5 | 30.0 | Fail |
| 12 | P/E Copolymer[b] | 4 | 25 | 5.0 | none | 30.0 | Fail |
| 13 | P/E Copolymer[b] | 4 | 22.5 | 5.0 | none | 27.5 | V-O |
| 14 | P/E Copolymer[b] | 2 | 26.0 | 5.0 | 2.5 | 33.5 | V-O |
| 15 | P/E Copolymer[b] | 4 | 25.0 | none | 1.5 | 26.5 | V-II |
| 16 | Polypropylene[a] | 2 | 22.5 | none | 1.9 | 24.4 | V-II |
| 17 | Polypropylene[a] | 2 | 22.5 | none | 2.5 | 25 | V-O |
| 18 | Polypropylene[a] | 2 | 25.0 | none | 1.5 | 26.5 | V-O |
| 19 | Polypropylene[a] | 2 | 25.0 | none | 1.9 | 26.9 | V-O |
| 20 | Polypropylene[a] | 2 | 27.0 | none | 1.9 | 28.9 | V-O |
| 21 | Polypropylene[a] | 2 | 20.0 | 1.9 | 1.0 | 22.9 | V-O |
| 22 | Polypropylene[a] | 2 | 20.0 | 1.9 | 1.9 | 23.8 | V-I |
| 23 | Polypropylene[a] | 2 | 22.5 | 1.9 | 0.9 | 25.4 | V-I |
| 24 | Polypropylene[a] | 2 | 22.5 | 1.9 | 1.9 | 26.3 | V-O |
| 25 | Polypropylene[a] | 2 | 22.5 | 5 | 2.5 | 35 | V-O |
| 26 | 90/10 Blend[c] | 3 | 30.0 | none | none | 30 | V-O |
| 27 | 90/10 Blend[c] | 3 | 22.5 | 1.9 | 1.9 | 26.3 | Fail |
| 28 | 90/30 Blend[c] | 3 | 22.5 | 1.9 | 1.9 | 26.3 | V-I |
| 29 | 60/40 Blend[c] | 3 | 22.5 | 1.9 | 1.9 | 26.3 | Fail |
| 30 | 50/50 Blend[c] | 3 | 22.5 | 1.9 | 1.9 | 26.3 | Fail |
| 31 | 75/25 Blend[c] | 3 | 22.5 | 3.0 | 3.0 | 28.5 | V-I |
| 32 | 75/25 Blend[c] | 3 | 22.5 | 5 | none | 27.5 | V-O |
| 33 | 75/25 Blend[c] | 3 | 22.5 | 5 | 2.5 | 30 | V-O |
| 34 | 75/25 Blend[c] | 3 | 25.0 | 2.5 | 2.5 | 30 | V-O |
| 35 | 75/25 Blend[c] | 3 | 25.0 | none | 5.0* | 30 | V-O |
| 36 | 75/25 Blend[c] | 3 | 27.5 | 2.5 | 2.5 | 32.5 | V-O |

Notes:
*Run 35 employed $ZnBr_2$; all others ZnO
[a]Homopolymers, about 5 melt flow. Used in fluff (unpelletized) form.
[b]Unpelletized copolymers of propylene with about 10 weight % ethylene. About 4 melt flow.
[c]Blends of b and commercial ethylene-propylene-rubber (Exxon Vistalon 606 EPR).

Runs 1–15 employed the ethylene/propylene copolymer used in Example II. Runs 1–9, 12, 13, and 15 are comparison runs since they did not contain both the hydrohalide salt and a zinc oxide. Runs 10 and 14 demonstrate that the combination is effective in imparting flame resistance to such an ethylene/propylene copolymer. A comparison of Runs 10 and 11 shows that at a given level of PCFR the enhancement does not necessarily increase with an increase in the amount of zinc oxide and dihydrobromide.

Runs 16–25 employed polypropylene. Runs 16–20 are comparison runs. Runs 21–25 demonstrate that the combination of hydrohalide salt and zinc oxide does promote the effectiveness of PCFR No. 2. A comparison of Runs 21 and 22 again shows that at a given level of PCFR the enhancement does not necessarily increase with an increase in the amount of zinc oxide and dihydrobromide.

Runs 26–36 employ blends of the above-mentioned ethylene/propylene copolymer and ethylene-propylene-rubber. Runs 26–30 indicate that generally the weight proportions of the two polymeric materials included in the composition does not affect the flame resistance provided by a particular combination of PCFR, hydrohalides salt, and zinc oxide. Runs 32 and 35 are comparison runs. Runs 33, 34, and 36 demonstrate loadings of PCFR, hydrohalide salt, and zinc oxide, which will impart a flame rating of V-O.

The data above disclosed on the foregoing specific compositions have been provided for the purpose of illustration only and is not intended to unduly limit the scope of the present invention as defined by the following claims. Since an object of this invention is to reduce the loading of flame retardance required, it should be clear that it is preferred that the flame retardant additives in the inventive polyolefin compositions consist essentially of the defined phosphorus-containing flame retardant and zinc oxide, zinc bromide, or a combination of zinc oxide and zinc bromide, or the designed phosphorus-containing flame retardant, the above-designed hydrohalide salt, and zinc oxide, zinc bromide, or a mixture of zinc oxide and zinc bromide.

What is claimed is:

1. A flame-resistant polyolefin composition comprising (1) normally solid polyolefin; (2) a phosphorus-containing flame retardant comprising the reaction product of (a) at least one phosphorus oxide compound of the formula $(P_2O_5)_{0.5-1.0}(H_2O)_{0.0-1.5}$, (b) melamine, and (c) at least one saturated open-chain polyol containing from 5 to 15 carbon atoms and from 4 to 8 hydroxyl groups per molecule, which reaction product has been heated prior to incorporation into said polyolefin composition under such conditions that said reaction product will not cause the significant foaming of the polyolefin composition when said polyolefin composition is subjected to molding conditions; and (3) at least one zinc compound selected from the group consisting of zinc oxide and zinc bromide; wherein said phosphorus-containing flame retardant is present in an amount that alone would be insufficient to impart to said polyolefin a flame resistance rating of V-O according to the Modified UL-94 test and wherein said at least one zinc compound is present in an amount which enhances the flame resistance provided by the phosphorus-containing flame retardant.

2. A flame-resistant composition according to claim 1 wherein said solid polyolefin is a homopolymer or copolymer of mono-alpha-olefins having the general formula $CH_2=CHR$ wherein R represents hydrogen or a hydrocarbyl radical having from 1 to 10 carbon atoms.

3. A flame-resistant composition according to claim 1 wherein the amount of phosphorus-containing flame retardant present is in the range of about 10 to about 75 php and the amount of said at least one zinc compound is in the range of about 0.1 to about 15 php.

4. A flame-resistant composition according to claim 3 wherein the phosphorus-containing flame retardant is prepared from about 1 to about 100 parts by weight of each of said phosphorus oxide compound, said melamine, and said polyol.

5. A flame-resistant composition according to claim 4 wherein the phosphorus-containing flame retardant is prepared from orthophosphoric acid, phosphorus pentoxide, melamine, and at least one of said polyols.

6. A flame-resistant composition according to claim 5 wherein the parts by weight of each ingredient employed in preparing the phosphorus-containing flame retardant per hundred parts by weight of the total of said ingredients falls within the following ranges:

| | |
|---|---|
| orthophosphoric acid | 0.5–25 |
| phosphorus pentoxide | 10–75 |
| polyol | 5–30 |
| melamine | 10–70. |

7. A flame-resistant composition according to claim 6 wherein each of said at least one polyol is selected from the group consisting of pentaerythritol, dipentaerythritol, and tripentaerythritol.

8. A flame-resistant composition according to claim 7 wherein the amounts of said orthophosphoric acid, said phosphorus pentoxide, said melamine, and said polyol employed in preparing the phosphorus-containing flame retardant are such that the respective molar ratio of the ingredients is in the range of 0.5–1.5:2–3:2–3:0-.5–2.5.

9. A flame-resistant composition according to claim 7 wherein the amount of said phosphorus-containing flame retardant present is in the range of about 15 to about 40 php and the amount of said at least one zinc compound is in the range of about 0.5 to about 8 php.

10. A flame-resistant composition according to claim 9 containing about 0.5 to about 8 php of zinc oxide.

11. A flame-resistant composition according to claim 9 containing about 0.5 to about 8 php of zinc bromide.

12. A flame-resistant composition according to claim 9 wherein there is also present a hydrohalide salt of a mono-or diamine in which the amine group is attached to a hydrocarbyl radical wherein the number of carbon atoms in said hydrocarbyl radical is in the range of from 2 to 24, wherein said hydrohalide salt is present in such an amount that the combination of said hydrohalide salt and said phosphorus-containing flame retardant would alone be insufficient to impart to said polyolefin a flame resistance rating of V-O according to the Modified UL-94 test.

13. A flame-resistant composition according to claim 12 wherein the amount of said hydrohalide salt present is in the range of about 0.5 to about 8 php.

14. A flame-resistant composition according to claim 4 wherein the phosphorus-containing flame retardant is prepared from condensed phosphoric acid, melamine, and at least one of said polyols.

15. A flame-resistant composition according to claim 14 wherein the parts by weight of each ingredient employed in preparing the phosphorus-containing flame retardant per hundred parts by weight of the total of said ingredients falls within the following ranges:

| | |
|---|---|
| condensed phosphoric acid | 25–75 |
| melamine | 10–70 |
| polyol | 5–50. |

16. A flame-resistant composition according to claim 15 wherein each of said at least one polyol is selected from the group consisting of pentaerythritol, dipentaerythritol, and tripentaerythritol.

17. A flame-resistant composition according to claim 16 wherein the amount of said phosphorus-containing flame retardant present is in the range of about 15 to about 40 php and the amount of said at least one zinc compound is in the range of about 0.5 to about 8 php.

18. A flame-resistant composition according to claim 17 containing about 0.5 to about 8 php zinc oxide.

19. A flame-resistant composition according to claim 17 containing about 0.5 to about 8 php zinc bromide.

20. A flame-resistant composition according to claim 17 wherein there is also present a hydrohalide salt of a mono-or diamine in which the amine group is attached to a hydrocarbyl radical wherein the number of carbon atoms in said hydrocarbyl radical is in the range of from 2 to 24, wherein said hydrohalide salt is present in such an amount that the combination of said hydrohalide salt and said phosphorus-containing flame retardant would alone be insufficient to impart to said polyolefin a flame resistance rating of V-O according to the Modified UL-94 test.

21. A flame-resistant composition according to claim 20 wherein the amount of said hydrohalide salt present is in the range of about 0.5 to about 8 php.

22. A flame-resistant composition according to claim 3 wherein there is also present a hydrohalide salt or a mono-or diamine in which the amine group is attached to a hydrocarbyl radical wherein the number of carbon atoms in said hydrocarbyl radical is in the range of from 2 to 24, wherein said hydrohalide salt is present in such an amount that the combination of said hydrohalide salt and said phosphorus-containing flame retardant would alone be insufficient to impart to said polyolefin a flame resistance rating of V-O according to the Modified UL-94 test.

* * * * *

UNITED STATES PATENT AND TRADEMARK OFFICE
CERTIFICATE OF CORRECTION

PATENT NO. : 4,043,975
DATED : August 23, 1977
INVENTOR(S) : Howard W. Bost

It is certified that error appears in the above-identified patent and that said Letters Patent are hereby corrected as shown below:

Column 14, line 13, delete "or" and insert --- of ---.

Signed and Sealed this

Eighth Day of August 1978

[SEAL]

Attest:

RUTH C. MASON
Attesting Officer

DONALD W. BANNER
Commissioner of Patents and Trademarks